United States Patent
Ichimura et al.

(10) Patent No.: US 9,485,014 B2
(45) Date of Patent: Nov. 1, 2016

(54) TRANSMISSION APPARATUS, TRANSMISSION SYSTEM, AND FAILURE DETECTION METHOD

(71) Applicant: FUJITSU LIMITED, Kawasaki-shi, Kanagawa (JP)

(72) Inventors: Kohei Ichimura, Fuchu (JP); Yasuko Nozu, Kawasaki (JP); Tsuyoshi Ohigawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/974,303

(22) Filed: Aug. 23, 2013

(65) Prior Publication Data
US 2014/0119722 A1    May 1, 2014

(30) Foreign Application Priority Data
Oct. 31, 2012 (JP) ................................. 2012-240986

(51) Int. Cl.
*H04B 17/00* (2015.01)
*H04B 10/071* (2013.01)
*H04B 10/032* (2013.01)

(52) U.S. Cl.
CPC .......... *H04B 10/071* (2013.01); *H04B 10/032* (2013.01)

(58) Field of Classification Search
CPC .......................... H04B 10/032; H04B 10/071
USPC .......................................................... 398/16
See application file for complete search history.

(56) References Cited

U.S. PATENT DOCUMENTS

| 5,579,421 | A  | * | 11/1996 | Duvall  | G02B 6/12004 385/14 |
|---|---|---|---|---|---|
| 6,388,741 | B1 | * | 5/2002  | Beller  | 356/73.1 |
| 6,534,997 | B1 | * | 3/2003  | Horishita | H04B 10/07 324/533 |
| 7,920,786 | B2 | * | 4/2011  | Ye et al. | 398/3 |
| 8,078,052 | B2 | * | 12/2011 | Aprile | H04J 14/029 398/10 |
| 8,687,957 | B2 | * | 4/2014  | Perron | H04B 10/0795 398/25 |
| 2002/0071148 | A1 | * | 6/2002 | Purse et al. | 359/110 |
| 2004/0114925 | A1 | * | 6/2004 | Berthold et al. | 398/45 |

(Continued)

FOREIGN PATENT DOCUMENTS

| JP | 4-310027 | 11/1992 |
|---|---|---|
| JP | 6-229713 | 8/1994 |

(Continued)

OTHER PUBLICATIONS

Japanese Office Action mailed May 10, 2016 in related Japanese Application No. 2012-240986.

*Primary Examiner* — Ken N Vanderpuye
*Assistant Examiner* — Amritbir Sandhu
(74) *Attorney, Agent, or Firm* — Staas & Halsey LLP

(57) ABSTRACT

A transmission apparatus includes a plurality of output units and a detector. The plurality of output units is configured to couple to a plurality of transmission paths, respectively, branched from one transmission path. The plurality of output units includes at least one first output unit configured to transmit signal light selectively to one of the branched transmission paths, and at least one second output unit configured to transmit test light with a wavelength different from a wavelength of the signal light to another of the branched transmission paths. The detector is configured to decide a failure in the branched transmission paths, based on a result of detection of a reflected light of the test light received through at least one of the branched transmission paths.

16 Claims, 15 Drawing Sheets

(56) References Cited

U.S. PATENT DOCUMENTS

| | | | | |
|---|---|---|---|---|
| 2008/0175587 A1* | 7/2008 | Jensen | | 398/2 |
| 2009/0245792 A1* | 10/2009 | Oishi | H04Q 11/0067 | 398/66 |
| 2009/0263122 A1* | 10/2009 | Helkey | H04B 10/032 | 398/7 |
| 2010/0027989 A1* | 2/2010 | Lewis | H04J 14/0227 | 398/2 |
| 2010/0098407 A1* | 4/2010 | Goswami | H04B 10/032 | 398/5 |
| 2010/0290780 A1* | 11/2010 | Teipen | | 398/27 |
| 2011/0013904 A1* | 1/2011 | Khermosh | G01M 11/3118 | 398/16 |
| 2011/0255860 A1* | 10/2011 | Lee | G01M 11/3136 | 398/12 |
| 2012/0237213 A1* | 9/2012 | Yin | H04L 43/50 | 398/28 |
| 2012/0281978 A1* | 11/2012 | Zou | H04B 10/032 | 398/5 |
| 2013/0223841 A1* | 8/2013 | Lee | H04J 14/0232 | 398/72 |
| 2013/0243418 A1* | 9/2013 | Haramaty | H04B 10/032 | 398/5 |
| 2013/0259470 A1* | 10/2013 | Zhong | H04B 10/07 | 398/16 |
| 2013/0266306 A1* | 10/2013 | Kozaki | H04J 3/0655 | 398/5 |
| 2013/0322869 A1* | 12/2013 | Hirth | H04B 10/0771 | 398/16 |
| 2014/0093232 A1* | 4/2014 | Hood | H04B 10/032 | 398/5 |
| 2014/0097756 A1* | 4/2014 | Zhong | H04B 10/071 | 315/151 |
| 2014/0119722 A1* | 5/2014 | Ichimura | H04B 10/071 | 398/16 |
| 2014/0126900 A1* | 5/2014 | Urban | G01M 11/3145 | 398/13 |
| 2014/0178074 A1* | 6/2014 | Xu | H04Q 11/0067 | 398/66 |
| 2014/0186019 A1* | 7/2014 | Chaudhary | H04B 10/032 | 398/1 |
| 2014/0212131 A1* | 7/2014 | Zhang | H04B 10/0771 | 398/16 |
| 2014/0226966 A1* | 8/2014 | Lutgen | H04J 14/0283 | 398/5 |
| 2015/0010298 A1* | 1/2015 | Menard | H04J 14/0287 | 398/5 |

FOREIGN PATENT DOCUMENTS

| | | | | |
|---|---|---|---|---|
| JP | 2000-49702 | 2/2000 | | |
| JP | 2005-269246 | 9/2005 | | |
| JP | 2007-515815 | 6/2007 | | |
| WO | WO 2005/015798 | 2/2005 | | |
| WO | PCT/SE2011/051019 | * | 8/2011 | H04B 10/08 |

* cited by examiner

FIG. 8

| POWER P OF REFLECTED LIGHT Lref (SYSTEM 0 [WORK]) | POWER P OF REFLECTED LIGHT Lref (SYSTEM 1 [STANDBY]) | FAILURE POSITION |
|---|---|---|
| TH1 ≤ P ≤ TH2 | TH1 ≤ P ≤ TH2 | NONE |
| P < TH1 (P=0) | TH2 < P | TRANSMISSION PATH OF STANDBY SYSTEM |
| P < TH1 (P=0) | P < TH1 (P=0) | LIGHT SOURCE OF STANDBY SYSTEM |
| P < TH1 (P=0) | TH1 ≤ P ≤ TH2 | TRANSMISSION PATH OF WORK SYSTEM |

FIG. 14

| POWER P OF REFLECTED LIGHT Lref (SYSTEM 0 [WORK]) | POWER P OF REFLECTED LIGHT Lref (SYSTEM 1 [STANDBY]) | FAILURE POSITION |
|---|---|---|
| TH1 ≤ P ≤ TH2 | TH1 ≤ P ≤ TH2 | NONE |
| TH1 ≤ P ≤ TH2 | P < TH1 (P=0) | TRANSMISSION PATH OF STANDBY SYSTEM |
| P < TH1 (P=0) | P < TH1 (P=0) | LIGHT SOURCE OF STANDBY SYSTEM |
| TH2 < P | P < TH1 (P=0) | TRANSMISSION PATH OF WORK SYSTEM |

# TRANSMISSION APPARATUS, TRANSMISSION SYSTEM, AND FAILURE DETECTION METHOD

CROSS-REFERENCE TO RELATED APPLICATION

This application is based upon and claims the benefit of priority of the prior Japanese Patent Application No. 2012-240986, filed on Oct. 31, 2012, the entire contents of which are incorporated herein by reference.

FIELD

The embodiments discussed herein are related to a transmission apparatus, a transmission system, and a failure detection method.

BACKGROUND

A known transmission system includes redundant transmitters, receivers, and transmission paths in preparation for a failure of devices, transmission paths, or so on. One of redundant transmission systems is referred to as a work system and the other is referred to as a standby system. The work system is used for communication services at normal time and the standby system is used for communication services in place of the work system if the work system fails. The function for switching from the work system to the standby system is referred to as the automatic protection switch (APS).

For example, Japanese National Publication of International Patent Application No. 2007-515815 discloses an optical transmission system in which two optical input units and two optical output units disposed in a transmission apparatus are connected to a client apparatus via a Y-shaped cable.

SUMMARY

According to an aspect of the invention, a transmission apparatus includes: a plurality of output units configured to couple to a plurality of transmission paths, respectively, branched from one transmission path, the plurality of output units including at least one first output unit configured to transmit signal light selectively to one of the branched transmission paths, and at least one second output unit configured to transmit test light with a wavelength different from a wavelength of the signal light to another of the branched transmission paths; and a detector configured to decide a failure in the branched transmission paths, based on a result of detection of a reflected light of the test light received through at least one of the branched transmission paths.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a table depicting conditions for determining a failure;

FIG. 14 is a table depicting conditions for determining a failure in the other embodiment.

DESCRIPTION OF EMBODIMENTS

When the transmission apparatuses of the work system and the standby system are connected to the branched transmission paths such as a Y-shaped cable, the transmission apparatus of the standby system stops transmission while the transmission apparatus of the work system transmits a signal, so that signal light does not collide at a photoreceptor located in the confluence of branched transmission paths. Accordingly, even if a failure occurs in a transmission apparatus or transmission path of the standby system, the failure is not detected until the APS function performs switching from the work system to the standby system.

If a failure occurs in the work system, then the APS function performs switching, the transmission apparatus of the work system stops transmission, and the transmission apparatus of the standby system starts transmission. At this time, if there is a failure in the transmission apparatus or transmission path of the standby system, communication services degrade in quality or communication services are interrupted due to a recurrence of failure detection.

A transmission apparatus, transmission system, and failure detection method for effectively detecting a failure in the standby system will be described below with reference to embodiments.

First Embodiment

Figure 1:
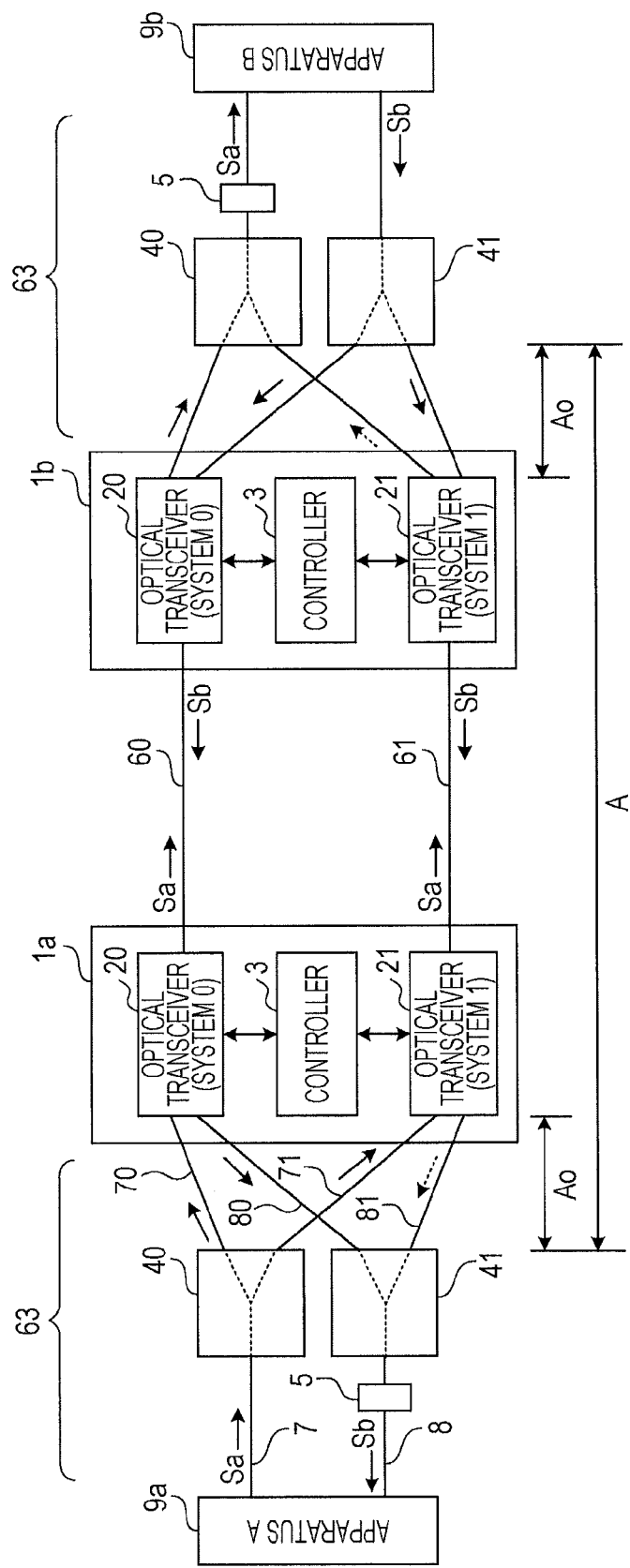
FIG. 1 is a block diagram depicting the structure of a transmission system according to an embodiment.

FIG. 1 is a block diagram depicting the structure of a transmission system according to an embodiment. The transmission system includes a set of transmission apparatuses 1*a* and 1*b* and a pair of first transmission paths 60 and 61 connecting the transmission apparatuses 1*a* and 1*b* to each other, respectively. The transmission system further includes second transmission paths 63 connecting the transmission apparatuses 1a and 1b and external apparatuses A 9a and B 9b to each other, respectively. The transmission paths 60, 61, and 63 include, for example, optical fibers.

Each of the transmission apparatuses 1a and 1b includes a pair of optical transceivers (system 0) 20 and (system 1) 21 that transmit and receive optical signals and a controller 3 that detects a failure and switches transmission paths. In the transmission apparatuses 1a and 1b, the optical transceivers (system 0) 20 are connected to each other via the first transmission path 60 and the optical transceivers (system 1) 21 are connected to each other via the first transmission paths 61. In the description below, system 0 is referred to as a work system and system 1 is referred to as a standby system.

The optical transceiver (system 0) 20 and the optical transceiver (system 1) 21 of the transmission apparatus 1a transmit optical signals Sa received via the second transmission paths 63 from the apparatus A 9a, to the optical transceiver (system 0) 20 and the optical transceiver (system 1) 21 of the other transmission apparatus 1b via the first transmission paths 60 and 61, respectively. On the other hand, the optical transceiver (system 0) 20 and the optical transceiver (system 1) 21 of the transmission apparatus 1b transmit optical signals Sb received via the second transmission paths 63 from the apparatus B 9b, to the optical transceiver (system 0) 20 and the optical transceiver (system 1) 21 of the other transmission apparatus 1a via the first transmission paths 60 and 61, respectively. The optical transceivers (system 0) 20 and the optical transceivers (system 1) 21 transmit the optical signals Sa and Sb bi-directionally via the first transmission paths 60 and 61, but the optical transceivers may transmit the signals individually via separate transmission paths.

As described above, the first transmission paths 60 and 61 between the transmission apparatuses 1a and 1b are configured redundantly (in a duplicate manner). Accordingly, even if a failure occurs in one of the pair of optical transceiver (system 0) 20 and optical transceiver (system 1) 21 or one of the first transmission paths 60 and 61, transmission is continuable by switching from work system 0 to work system 1.

In addition, the second transmission paths 63 between the apparatus A 9a and the transmission apparatus 1a, and the second transmission paths 63 between the apparatus B 9b and the transmission apparatus 1b are partially configured redundantly by two branched transmission paths. The second transmission paths 63 between the one transmission apparatus 1a and the apparatus A 9a will be described below, but this description is also applied to the second transmission paths 63 between the other transmission apparatus 1b and the apparatus B 9b.

The second transmission paths 63 include a reception side transmission path 7, a transmission side transmission path 8, a demultiplexer 40, a multiplexer 41, two transmission paths 70 and 71 branched from the reception side transmission path 7, two transmission paths 80 and 81 branched to the transmission side transmission path 8, and an optical filter 5. The reception side transmission path 7 and the two transmission paths 70 and 71 are connected to each other via the demultiplexer 40, and the transmission side transmission path 8 and the two transmission paths 80 and 81 are connected to each other via the multiplexer 41.

The demultiplexer 40 is, for example, a splitter. The demultiplexer 40 evenly divides the power of a light beam input from the reception side transmission path 7 into the two transmission paths 70 and 71 and outputs the divided light beams to them. The multiplexer 41 is, for example, a coupler. The multiplexer 41 is connected between the transmission side transmission path 8 and the two transmission paths 80 and 81, combines the light beams input from the two transmission paths 80 and 81 into one light beam, and outputs it to the transmission side transmission path 8. The demultiplexer 40 and the multiplexer 41 have mutually different effects on the optical signals Sa and Sb, so they are identified as described above. However, the splitter and the coupler have a function for demultiplexing or multiplexing light depending on the transmission direction of the light, so there are no functional differences.

The optical signal Sa output from the apparatus A 9a is input to the demultiplexer 40 via the reception side transmission path 7. The optical signal Sa input to the demultiplexer 40 is branched and the branched optical signals are input to a pair of optical transceiver (system 0) 20 and optical transceiver (system 1) 21 via the two transmission paths 70 and 71, respectively. The pair of optical transceiver (system 0) 20 and the optical transceiver (system 1) 21 send the optical signal Sa to the optical transceiver (system 0) 20 and the optical transceiver (system 1) 21 of the other transmission apparatus 1b via the first transmission paths 60 and 61, as described above.

In addition, the optical transceiver (system 0) 20 of the one transmission apparatus 1a receives, via the first transmission path 60, the optical signal Sb output by the apparatus B 9b from the optical transceiver (system 0) 20 of the other transmission apparatus 1b. The optical transceiver (system 0) 20 of apparatus 1a outputs the received optical signal Sb to the multiplexer 41 via the transmission path 80. The optical signal Sb input to the multiplexer 41 is input to the apparatus A 9a via the optical filter 5 and the transmission side transmission path 8.

On the other hand, the other optical transceiver (system 1) 21 in apparatus 1a internally terminates the optical signal Sb received via the first transmission path 61 without outputting it to the multiplexer 41 via the transmission path 81 (see the arrow with a dashed line). This is because, if the optical transceiver (system 1) 21 outputs the optical signal Sb to the multiplexer 41, when the optical signal Sb is received by the apparatus A 9a, it collides with the optical signal Sb from the optical transceiver (system 0) 20, causing an error.

If a failure occurs in the optical transceivers (system 0) 20 or the transmission path 80 of the work system, when no error is detected in the standby system (system 1), the controller 3 outputs a switching signal to the optical transceiver (system 0) 20 and the optical transceiver (system 1) 21 to switch the work system to system 1. This causes the optical transceiver (system 1) 21 to output the optical signal Sb to the multiplexer 41 as the work system, instead of the optical transceiver (system 0) 20 of the original work system.

The failure detection of the work system is performed when, for example, the apparatus A 9a monitors the optical signal Sb output from the optical transceiver (system 0) 20 of apparatus 1a. In this case, if, for example, the optical signal Sb is not detected or the error rate of the optical signal Sb exceeds a certain value, the apparatus A 9a sends a failure occurrence report to the transmission apparatus 1a via the transmission path 7, 70, or 71 on the transmission side. When receiving the failure occurrence report, the optical transceivers (system 0) 20 and the optical transceiver (system 1) 21 report occurrence of an error in the work system to the control unit 3.

As described above, the section of the transmission system indicated by symbol A in FIG. 1 is configured redundantly. In the following, failure detection in the transmission sections Ao (of the section A) of two transmission paths 80 and 81 branched to the transmission side transmission path 8 will be described.

As described above, while the optical transceiver (system 0) 20 of the apparatus 1a outputs the optical signal Sb to the transmission path 80, the optical transceiver (system 1) 21 of the standby system does not output the optical signal Sb to the transmission path 81. Accordingly, in a conventional structure, even if a failure occurs in the optical transceiver (system 1) 21 of the standby system and the transmission path 81, the failure is not detected until the work system is switched.

Figure 2:
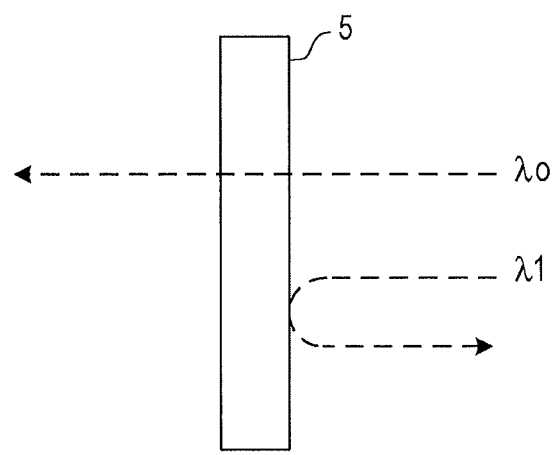
FIG. 2 depicts the function of a filter.

The transmission apparatuses 1a and 1b according to the embodiment output test light to one of the transmission paths 80 and 81 from the optical transceiver (system 0) 20 and the optical transceiver (system 1) 21 of the work or standby system, reflect the test light using the optical filter 5 disposed in the transmission side transmission path 8, and detect a failure in the standby system. FIG. 2 depicts the function of the optical filter 5.

The optical filter 5 is an optical wavelength reflective/transmissive filter that passes the light with specific wavelength $\lambda 0$ and reflects the light with the other wavelength $\lambda 1$. More specifically, the optical filter 5 passes the signal light with specific wavelength $\lambda 0$ and reflects the test light (light of the optical signals Sa and Sb) with wavelength $\lambda 1$. The optical filter 5 fully reflects test light, so it may be disposed near the multiplexer 41.

This enables the optical filter 5 to block test light from being received by the apparatus A 9a and generate test light used to test the standby system. This reflected light is received by the optical transceiver (system 0) 20 and the optical transceiver (system 1) 21 of the work system and the standby system via the transmission paths 80 and 81 and is used for failure detection in the standby system.

Figure 3:
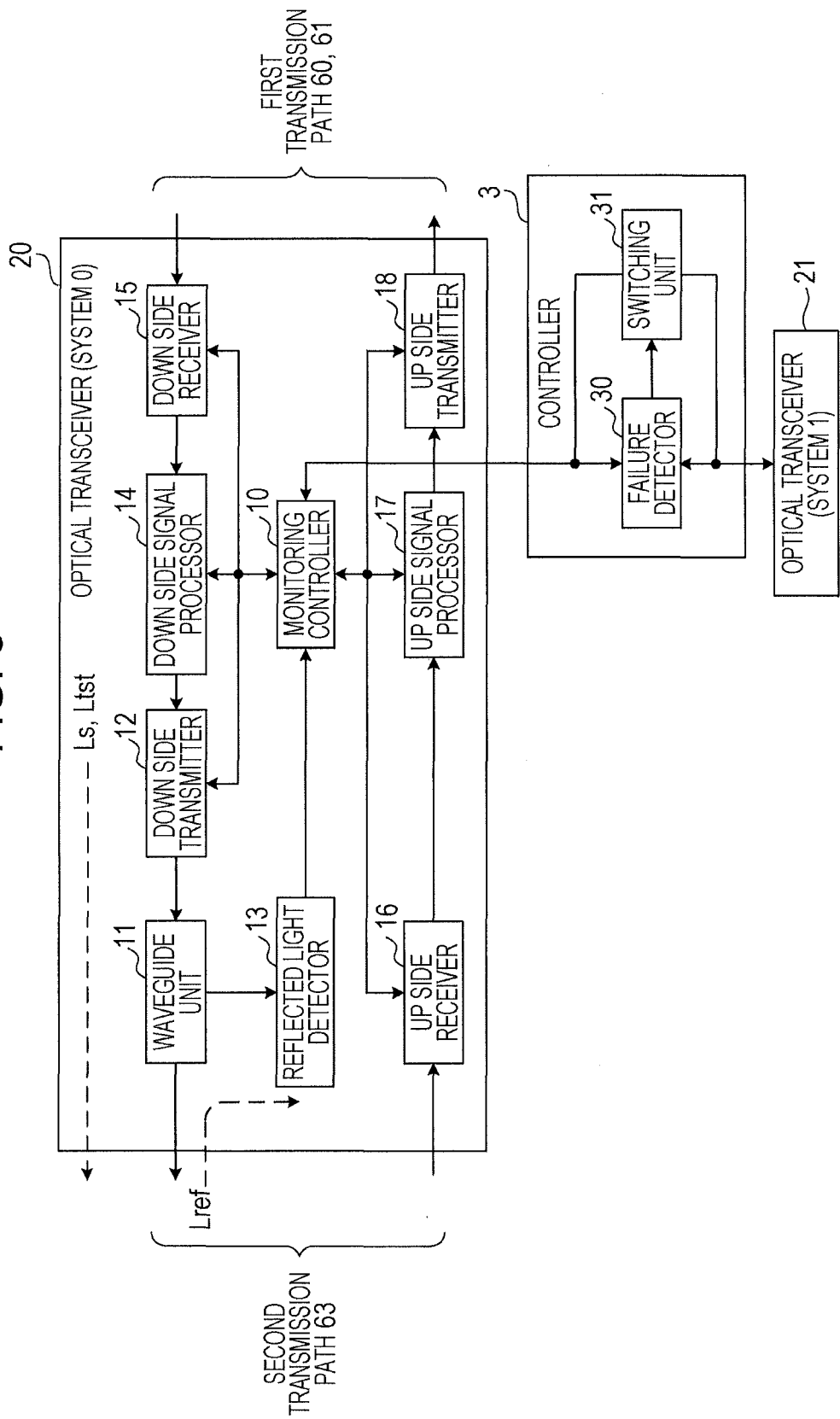
FIG. 3 is a block diagram depicting the functional structures of transmission apparatuses according to the embodiment.

FIG. 3 is a block diagram depicting the functional structures of transmission apparatuses 1a and 1b according to the embodiment. In FIG. 3, the structure of the optical transceiver (system 1) 21 is the same as in the optical transceiver (system 0) 20, so the structure is omitted.

The optical transceiver (system 0) 20 and the optical transceiver (system 1) 21 include a monitoring controller 10, a waveguide unit 11, a down side transmitter 12, a reflected light detector 13, a down side signal processor 14, and a down side receiver 15. The optical transceivers (system 0) 20 and the optical transceiver (system 1) 21 further include an up side receiver 16, an up side signal processor 17, and an up side transmitter 18. Here, the direction from the transmission apparatus 1a to the transmission apparatus 1b is referred to as "up side" and the direction from the transmission apparatus 1b to the transmission apparatus 1a is referred to as "down side", but "up side" and "down side" are used only to differentiate the transmission direction and do not limit the structure.

The up side receiver 16 receives the optical signal Sa from the apparatus A 9a via the second transmission paths 63 and converts (OE-converts) the received signal to an electric up signal. If the up side receiver 16 does not receive the optical signal Sa, the up side receiver 16 assumes the occurrence of a failure and notifies the monitoring controller 10 of the fact.

The up side signal processor 17 measures the error rate of an up signal and notifies the monitoring controller 10 of the result. In addition, the up side signal processor 17 monitors and reconfigures data included in the up signal based on the operation administration and maintenance (OAM) function. If the up side signal processor 17 detects a failure occurrence report transmitted from the apparatus A 9a in the data included in the up signal, the up side signal processor 17 notifies the monitoring controller 10 of the fact. An example of a signal form is the Ethernet (registered trademark) frame, but this is not restrictive.

The up side transmitter 18 converts (EO-converts) the data signal reconfigured by the up side signal processor 17 to the optical signal Sa and transmits the converted signal to the other transmission apparatus 1b via the first transmission paths 60 and 61.

On the other hand, the down side receiver 15 receives the optical signal Sb from the other transmission apparatus 1b via the first transmission paths 60 and 61 and converts the received signal to an electric down signal. If the down side receiver 15 does not receive the optical signal Sb, the down side receiver 15 assumes the occurrence of a failure and notifies the monitoring controller 10 of the fact.

The down side signal processor 14 measures the error rate of a down signal and notifies the monitoring controller 10 of the result. In addition, the down side signal processor 14 monitors and reconfigures data included in the down signal based on the OAM function.

The down side transmitter 12 such as, for example, a first output unit, converts the data signal reconfigured by the up side signal processor 14 to the optical signal Sb and transmits the converted signal to the apparatus A 9a as signal light Ls via the first transmission paths 80 and 81. As described above, the optical transceiver (system 0) 20 of the work system outputs the optical signal Sb to the transmission path 80 and the optical transceiver (system 1) 21 of the standby system does not output the optical signal Sb to the transmission path 81. That is, the down side transmitters 12 of the work system and the standby system output the signal light Ls selectively to the two transmission paths 80 and 81 to which the work system and the standby system are connected, respectively.

The down side transmitter 12 of the standby system (system 1) such as, for example, a second output unit, outputs the test light Ltst with wavelength $\lambda 1$, which is different than the wavelength of the signal light Ls, to a transmission path (that is, the transmission path 81 of the standby system) to which the signal light Ls is not input. The down side transmitter 12 is, for example, a tunable laser oscillator, which outputs either the signal light Ls or the test light Ltst from a common light source by selecting a wavelength. Accordingly, the signal light Ls and the test light Ltst are selectively output from a common tunable light source.

The monitoring controller 10 outputs a selection signal instructing the selection of the wavelength $\lambda 0$ of the signal light Ls to the down side transmitter 12 of the work system (system 0) and outputs a selection signal instructing the selection of the wavelength $\lambda 1$ of the test light Ltst to the down side transmitter 12 of the standby system (system 1). When the work system is switched to system 1, the monitoring controller 10 switches the selection of the wavelength accordingly.

The waveguide unit 11 is, for example, an optical waveguide device such as, for example, a splitter or optical circulator. The waveguide unit 11 guides the signal light Ls or the test light Ltst input from the down side transmitter 12 through the transmission paths 80 and 81 and guides the reflected light Lref of the test light Ltst input from the transmission paths 80 and 81 through the reflected light detector 13. The waveguide unit 11 may have a wavelength filtering function for guiding only the reflected light Lref of the test light Ltst through the reflected light detector 13.

The reflected light detector 13 is an optical detector such as, for example, a photodiode, which detects the level (intensity) of the reflected light Lref of the test light Ltst input from the transmission paths 80 and 81. The reflected light detector 13 outputs a level signal indicating the detected level of the reflected light Lref to the monitoring controller 10.

The monitoring controller 10 monitors the level of the reflected light Lref based on the level signal for the reflected light Lref input from the reflected light detector 13. The monitoring controller 10 also monitors the state of each transmission path. For example, the monitoring controller 10 detects a failure in the transmission path 80 of the work system based on a failure occurrence report from the apparatus A 9a.

The monitoring controller 10 communicates with the controller 3 to transmit data indicating the monitoring result. This data includes the level of the reflected light Lref and the state of the transmission path 80 of the work system. The controller 3 includes a failure detector 30 such as a detector and a switching unit 31. The failure detector 30 detects a failure in the work system and the standby system based on the monitoring result received from the monitoring controller 10 and outputs the detection result to the switching unit 31.

The switching unit 31 controls the switching of the work system based on the detection result of a failure. In other words, the switching unit 31 switches the selection of a transmitter that outputs the signal light Ls between the down side transmitters 12 of the work system and the standby system. When switching the work system, the switching unit 31 outputs the switching signal to the monitoring controllers 10 of system 0 and system 1. The monitoring controller 10 outputs the selection signal for instructing the selection of wavelength λ0 or λ1 to the down side transmitter 12 according to the switching signal from the controller 3.

Figure 4:
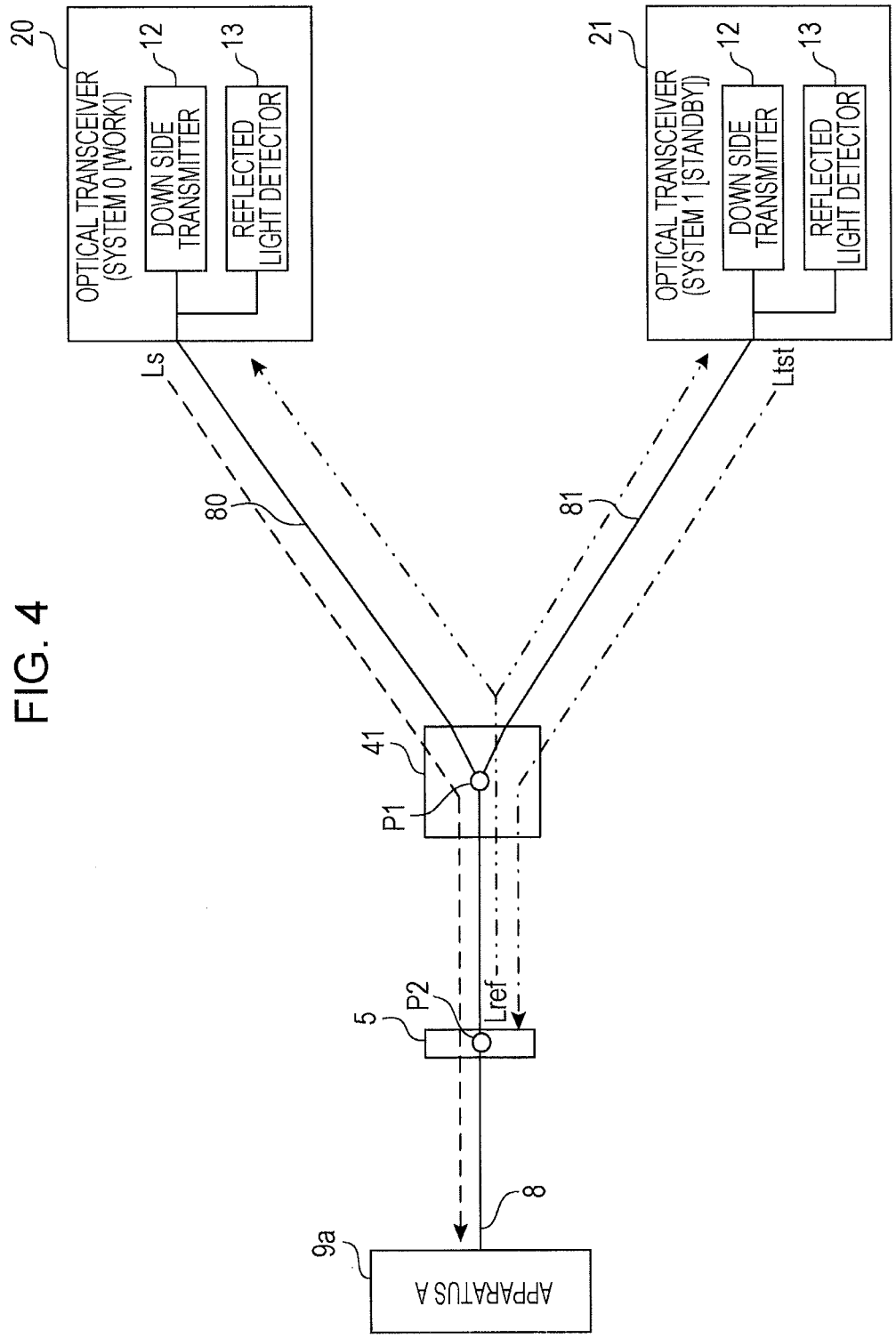
FIG. 4 depicts the paths of signal light, test light, and reflected light when no failure occurs.

Next, a method for detecting a failure in the standby system will be described in detail. FIG. 4 depicts the paths of the signal light Ls, test light Ltst, and reflected light Lref when no failure occurs. FIG. 4 depicts only a part of the structure depicted in FIGS. 1 and 3.

The signal light Ls output from the down side transmitter 12 of the work system (system 0) passes through the transmission path 80, the multiplexer 41, and the transmission side transmission path 8 and is input to the apparatus A 9a (see the dashed line). At this time, the optical filter 5 disposed in the transmission path 80 passes the signal light Ls with wavelength λ0 as described above.

The test light Ltst output from the down side transmitter 12 of the standby system (system 1) passes through the transmission path 81 and the multiplexer 41 and reaches the optical filter 5 disposed in the transmission side transmission path 8 (see the alternate long and short dashed line). At this time, the optical filter 5 reflects the test light Ltst with wavelength λ1 at a reflection point P2. This generates reflected light Lref with a propagation direction opposite to that of the test light Ltst.

The reflected light Lref passes through the transmission side transmission path 8, is input to the multiplexer 41, is branched at a branch point P1 in the multiplexer 41, and is input to the two transmission paths 80 and 81 (see the chain double-dashed line). The reflected light Lref input to the transmission path 80 is detected by the reflected light detector 13 of the work system (system 0) while the reflected light Lref input to the transmission path 81 is detected by the reflected light detector 13 of the standby system (system 1).

The failure detector 30 detects a failure based on the detection result of the reflected light Lref of the test light Ltst input from at least one of the transmission paths 80 and 81. More specifically, the controller 3 detects a failure in the transmission paths 80 and 81 based on the detection result of the level of the reflected light Lref in the monitoring controller 10.

Figure 5:
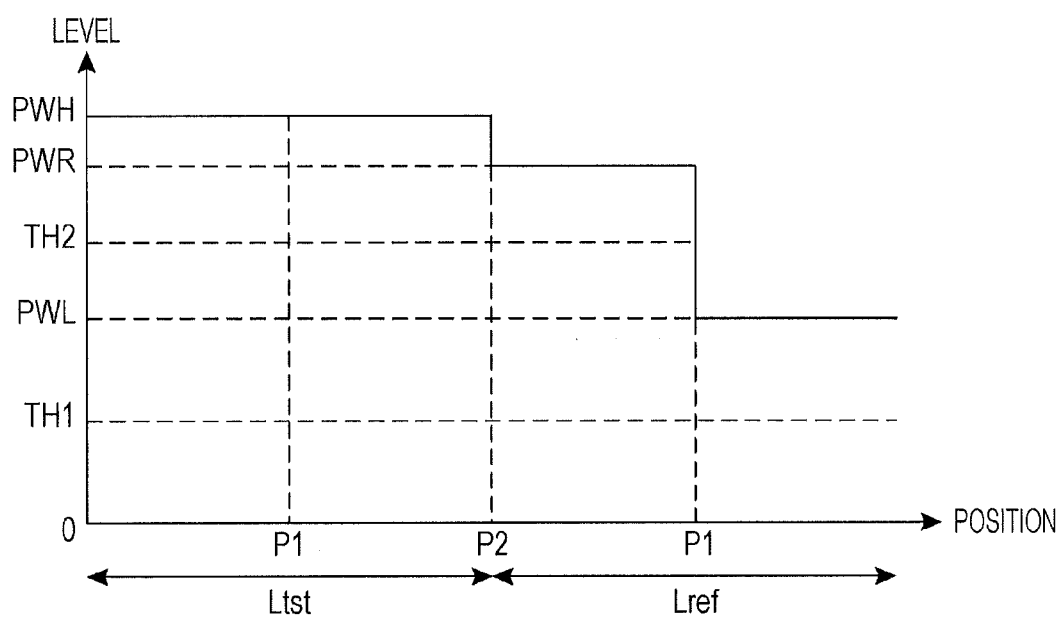
FIG. 5 is a graph depicting changes in the levels of test light and reflected light with respect to positions in the paths.

FIG. 5 is a graph depicting changes in the levels of test light Ltst and reflected light Lref with respect to positions in the paths. The test light Ltst maintains a certain level of PWH until it passes through the branch point P1 in the multiplexer 41 and reaches the reflection point P2 of the optical filter 5. When reflected at the reflection point P2, the test light Ltst reduces its level due to a loss caused by reflection. Accordingly, the level of the reflected light Lref becomes level PWR, which is lower than level PWH.

The reflected light Lref reduces its level to level PWL, which is less than half the initial level PWH, due to power demultiplexing effects by the multiplexer 41 when passing through the branch point P1 in the multiplexer 41. Accordingly, the levels of the reflected light Lref detected by the reflected light detectors 13 of the work system and the standby system fall between first threshold TH1 and second threshold TH2 depicted in FIG. 5, the transmission paths 80 and 81 are decided to be normal. The first threshold TH1 and second threshold TH2 are determined depending on the optical output level of the down side transmitter 12 etc. The length of the transmission path and a loss caused by wavelength dispersion in FIG. 5 are assumed to be negligibly small.

Figure 6:
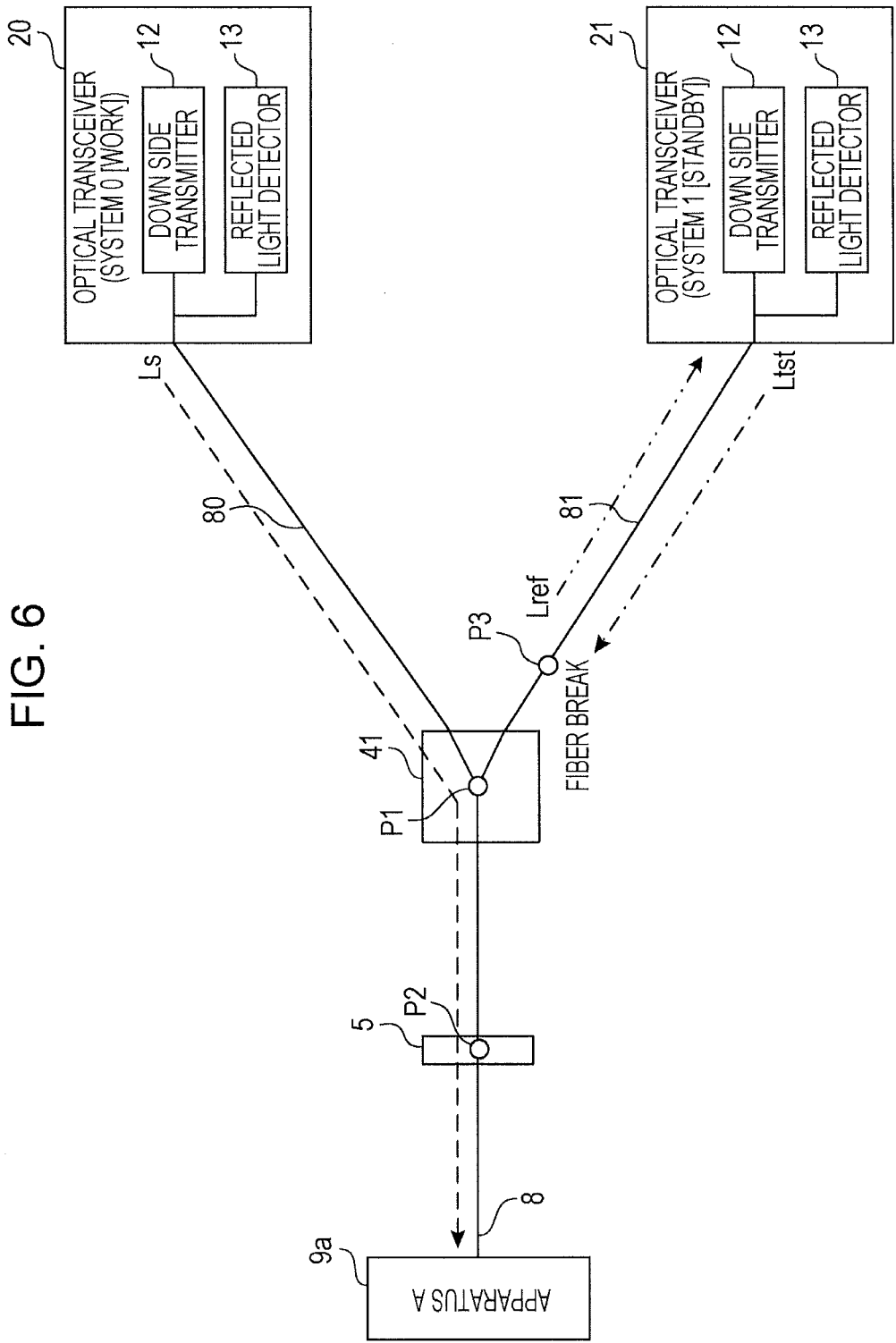
FIG. 6 depicts the paths of signal light, test light, and reflected light when a failure occurs in the transmission path of a standby system.

On the other hand, if a failure (for example, a disconnection of an optical fiber) occurs in the transmission path 81 of the standby system, the test light Ltst does not reach the optical filter 5. FIG. 6 depicts the paths of signal light Ls, test light Ltst, and reflected light Lref when a failure occurs in the transmission path 81 of the standby system. The signal light Ls output from the down side transmitter 12 of the work system passes through the transmission path 80, the multiplexer 41, and the transmission side transmission path 8 and is input to the apparatus A 9a (see the dashed line).

The test light Ltst output from the down side transmitter 12 of the standby system is reflected by a failure occurrence point P3 (that is, the cross section of the optical fiber) in the transmission path 81 (see the alternate long and short dashed line). At this time, the reflected light Lref does not reduce its level due to power demultiplexing at the branch point P1, so the level of the reflected light Lref detected by the reflected light detector 13 of the standby system is larger than level PWL in FIG. 5, which is approximately, for example, level PWR during reflection. Accordingly, if the level of the reflected light Lref detected by the reflected light detector 13 of the standby system is larger than the second threshold TH2, it is decided that a failure has occurred in the transmission path 81 of the standby system.

On the other hand, the reflected light Lref may not be detected by the reflected light detector 13 of the standby system. Accordingly, if the level of the reflected light Lref detected by the reflected light detector 13 of the work system is 0 or less than the first threshold TH1, it is decided that a failure has occurred in the transmission path 81 of the standby system.

Accordingly, when the reflected light Lref from the transmission path 80 of the work system is not detected, or the level of the reflected light Lref input from the transmission path 81 to which the test light Ltst was input is larger than the predetermined value TH2, the failure detector 30 detects a failure in the standby system. In the former case, since a failure is detected based on whether the reflected light Lref is present or absent, detection is easy. In this case, since the reflected light Lref from the transmission path 80 of the work system is detected, the reflected light Lref is not detected if a failure occurs in the transmission path 80.

On the other hand, in the latter case, since a failure decision is made based on the level of the reflected light Lref from the transmission path 81 of the standby system, a failure in the transmission path 81 of the standby system is detected separately from a failure in the work system. Since the magnitude of the level is determined in this case, the second threshold TH2 is adjusted based on the optical output level of the down side transmitter 12 or a loss caused in the transmission paths 8 and 81.

In addition, if a failure occurs in the down side transmitter 12 of the standby system, the test light Ltst is not output. Accordingly, the reflected light Lref is not detected by the reflected light detectors 13 of the work system and the standby system.

Figure 7:
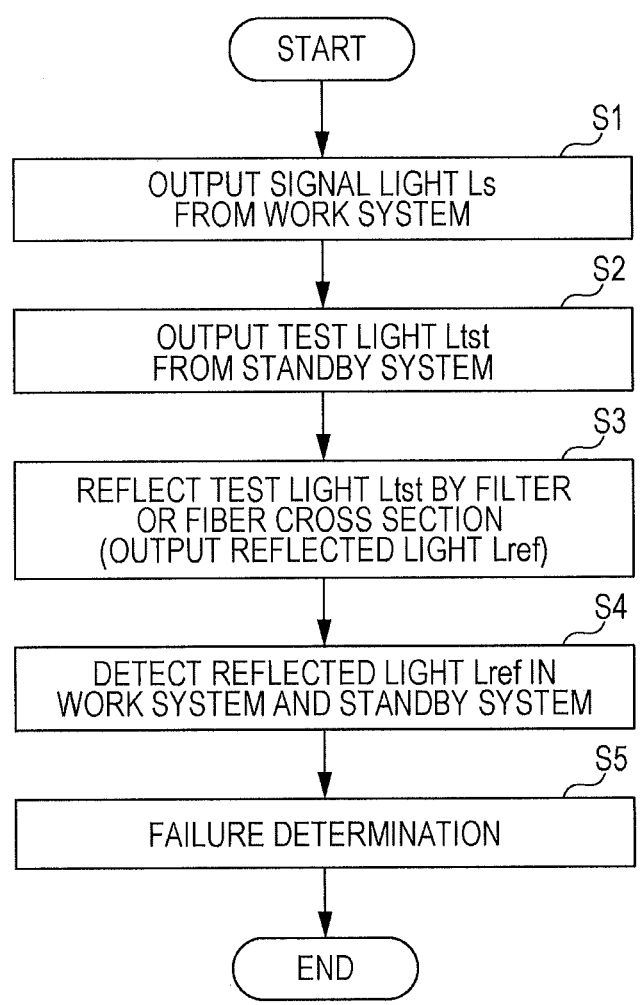
FIG. 7 is a flowchart depicting a flow of a failure detection method according to the embodiment.

FIG. 7 is a flowchart depicting a flow of a failure detection method according to the embodiment. First, the signal light Ls, is output selectively to the transmission paths 80 and 81 from the down side transmitter 12 of the work system and the standby system (operation S1). Next, the test light Ltst with a wavelength different than in the signal light Ls is output from the down side transmitter 12 of the standby system (system 1) to the transmission path 81 of the standby system (operation S2).

Next, the test light Ltst is reflected by the optical filter 5 disposed in the transmission side transmission path 8 or at the cross section of the optical fiber in the transmission path 81 of the standby system (operation S3). If a failure occurs in the down side transmitter 12 of the standby system, operation S3 is omitted.

Next, the reflected light detectors 13 of the work system and the standby system detect the reflected light Lref (operation S4). Next, the failure detector 30 makes failure determination of the transmission path 81 of the standby system based on the detection result of the reflected light Lref by at least one of the reflected light detectors 13 of the work system and the standby system (operation S5).

FIG. 8 depicts conditions for determining a failure. The conditions for determining a failure in the standby system are as described above. If only power P of the reflected light Lref of the work system is used for determination, when P<TH1 (P=0), it is impossible to determine whether the failure position is the transmission path 81 of the standby system, the down side transmitter 12 of the standby system (for example, the light source), or the transmission path 80 of the work system. However, if the reflected light Lref of the standby system is also used for determination, when P<TH1 (P=0) holds for power P, the failure position is determined to be the down side transmitter 12 (for example, light source) of the standby system.

As described above, the failure determination of the work system is made based on a failure occurrence report from the apparatus A 9a. However, the failure decision is also made by determining the conditions of power P of the reflected light Lref of the work system and the standby system.

For example, when only power P of the reflected light Lref of the work system is used for decision, when P<TH1 (P=0), it is impossible to determine whether the failure position is the transmission path 81, the down side transmitter 12, or the transmission path 80. However, when power P of the reflected light Lref of the standby system is also used for determination, if TH1≤P≤TH2 holds for power P, the failure position is determined to be the transmission path 80 of the failure position.

In addition, the failure determination of the work system may be made based on the reflected light of the signal light Ls instead of the reflected light Lref of the test light Ltst.

Figure 9:
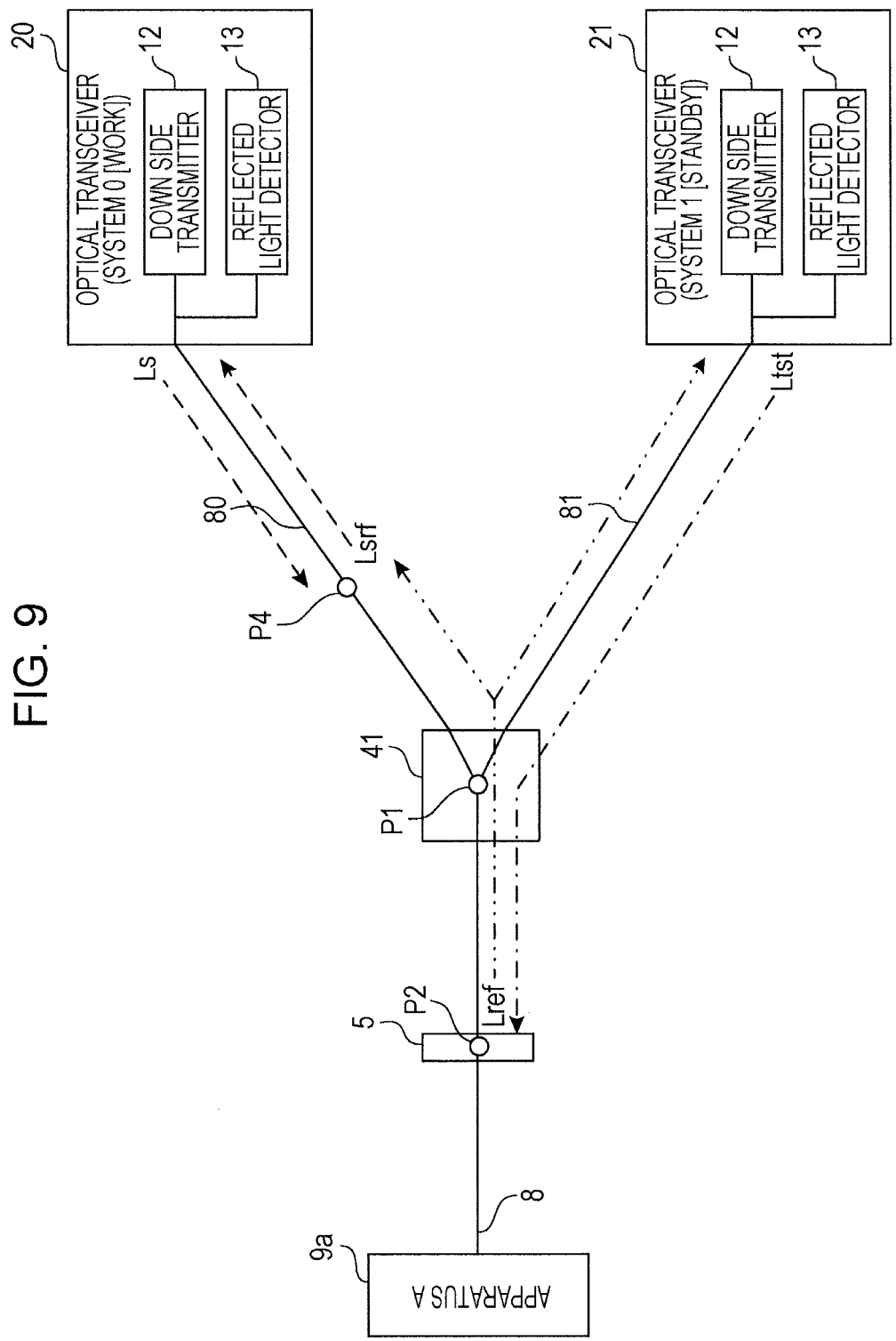
FIG. 9 depicts the paths of signal light, test light, and reflected light when a failure occurs in the transmission path of the work system.

FIG. 9 depicts the paths of signal light Ls, test light Ltst, and reflected light Lsrf when a failure occurs in the transmission path 81 of the work system. In this case, the signal light Ls output from the down side transmitter 12 of the work system is reflected at a failure occurrence point P4 (at a cross section of the optical fiber) in the transmission path 80 of the work system and the reflected light Lsrf is input to the reflected light detector 13 of the work system (see the dashed line). On the other hand, the test light Ltst output from the down side transmitter 12 of the standby system is reflected at the reflection point P2 and the reflected light Lref is input to the reflected light detector 13 of the standby system, but it is not input to the reflected light detector 13 of the work system.

Accordingly, a failure in the work system is detected when the reflected light detector 13 of the work system detects the reflected light Lsrf of the signal light Ls. In this structure, even if the external apparatus A 9a and apparatus B 9b do not have a failure occurrence report function, the transmission apparatuses 1a and 1b can detect a failure in the transmission path 80 of the work system.

In the present embodiment, the signal light Ls and the test light Ltst are output from a common light source (that is, the down side transmitter 12). Accordingly, a failure in the light source of the standby system is detected based on power P of the reflected light Lref, as depicted in FIG. 8. In this case, however, the down side transmitter 12 can transmit only one of the signal light Ls and the test light Ltst by selecting a wavelength, so the test light Ltst is output from the down side transmitter 12 of the standby system.

Second Embodiment

On the other hand, separate light sources may be disposed for the signal light Ls and the test light Ltst so that the test light Ltst is output from the down side transmitter 12 of the work system.

Figure 10:
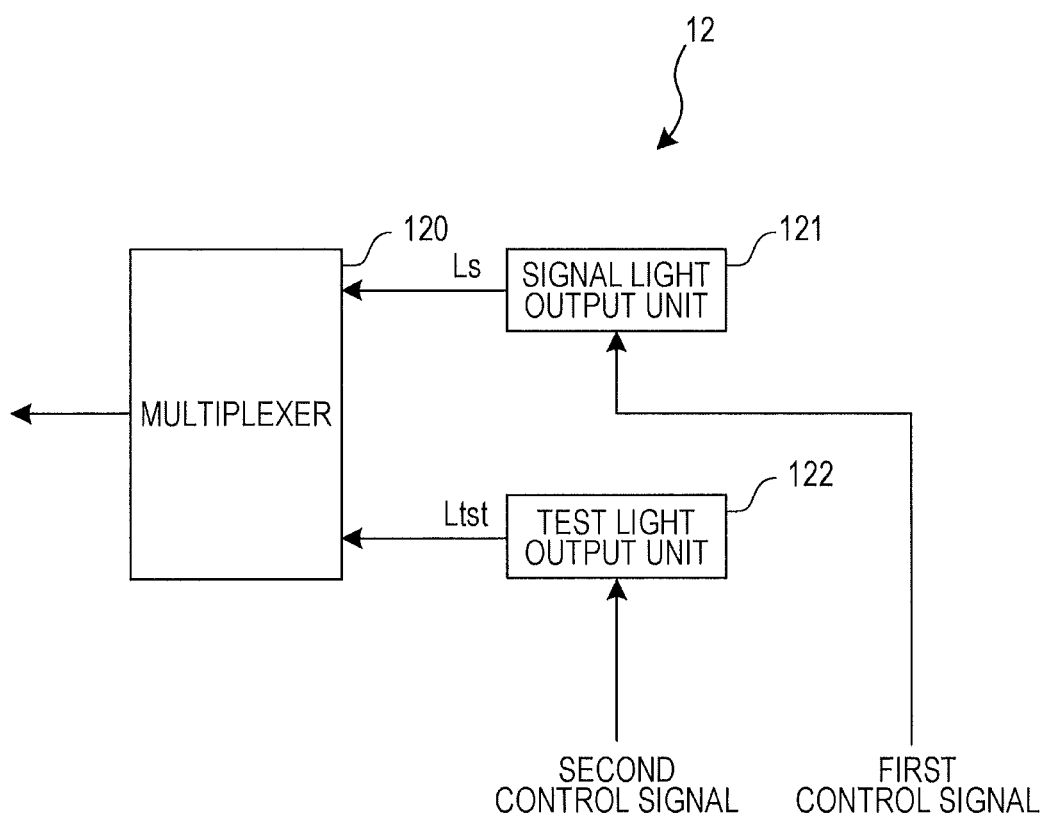
FIG. 10 is a block diagram depicting the functional structure of a down side transmitter according to another embodiment.

FIG. 10 is a block diagram depicting the functional structure of a down side transmitter 12 according to another embodiment. In the description below, the structure of the down side transmitter 12 of the work system will be described, but the description may be applied to the down side transmitter 12 of the standby system. The down side transmitter 12 includes a signal light output unit 121 (for example, a first output unit), a test light output unit 122 (for example, a second output unit), and a multiplexer 120. The signal light output unit 121 outputs the signal light Ls to the transmission path 80 according to the first control signal from the monitoring controller 10. The test light output unit 122 outputs the test light Ltst to the transmission path 80 to which the signal light Ls was input according to the second control signal from the monitoring controller 10. The multiplexer 120 multiplexes the signal light Ls from the signal light output unit 121 and the test light Ltst from the test light output unit 122 and outputs the multiplexed light to the transmission path.

The monitoring controller 10 of the work system (system 0) turns on an output of the signal light Ls from the signal output unit 121 and an output of the test light Ltst from the test light output unit 122 according to the first control signal and the second control signal. On the other hand, the monitoring controller 10 of the standby system (system 1) turns off an output of the signal light Ls from the signal output unit 121 and an output of the test light Ltst from the test light output unit 122 according to the first control signal and the second control signal.

Figure 11:
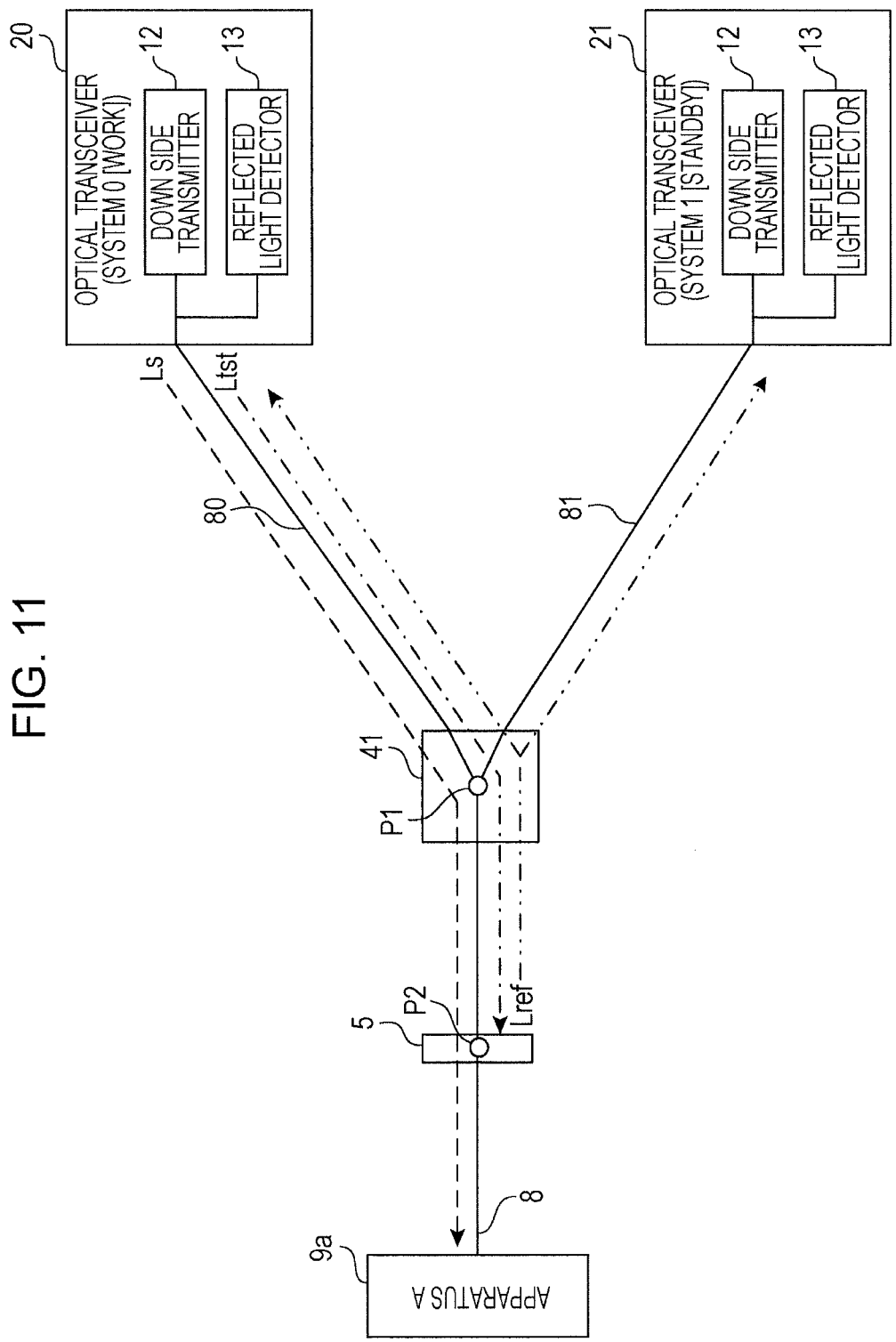
FIG. 11 depicts the paths of signal light, test light, and reflected light when no failure occurs.

FIG. 11 depicts the paths of signal light Ls, test light Ltst, and reflected light Lref when no failure occurs. FIG. 11 depicts only a part of the structure depicted in FIGS. 1 and 3.

The signal light Ls output from the down side transmitter 12 of the work system (system 0) passes through the transmission path 80, the multiplexer 41, and the transmission side transmission path 8 and is input to the apparatus A 9a (see the dashed line). In addition, the test light Ltst output from the down side transmitter 12 of the work system (system 0) passes through the transmission path 80 and the multiplexer 41, reaches the optical filter 5 disposed in the transmission side transmission path 8, and is reflected by the optical filter 5 (see the alternate long and short dashed line). The reflected light Lref passes through the transmission side transmission path 8, is input to the multiplexer 41, is branched at a branch point P1 in the multiplexer 41, and is input to the two transmission paths 80 and 81 (see the chain double-dashed line).

The reflected light Lref input to the transmission path 80 and the reflected light Lref input to the transmission path 81 are detected by the reflected light detectors 13 of the work system and the standby system. As in the embodiment described above, a failure is detected based on the level of the reflected light Lref.

Figure 12:
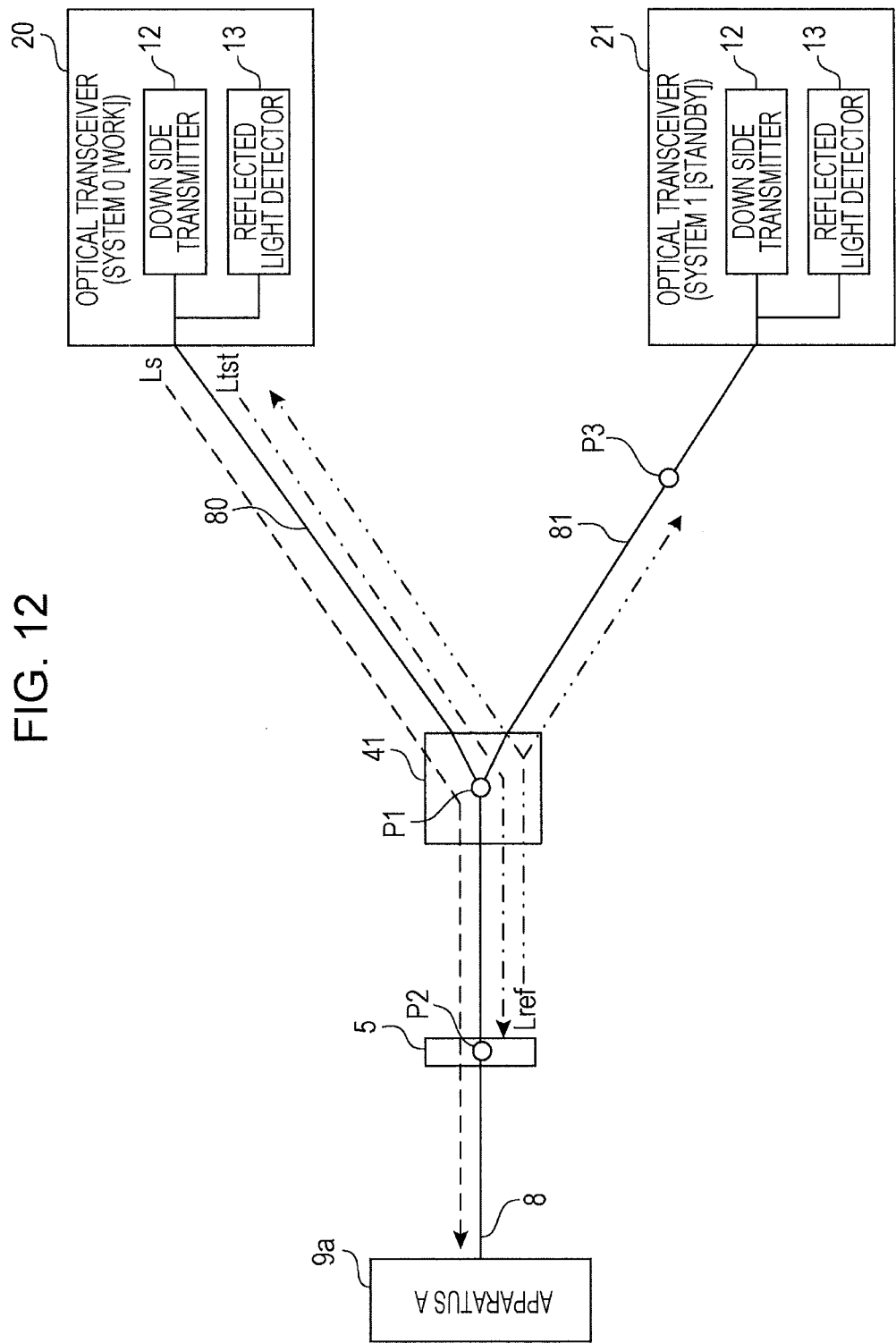
FIG. 12 depicts the paths of signal light, test light, and reflected light when a failure occurs in the transmission path of the standby system.

FIG. 12 depicts the paths of signal light Ls, test light Ltst, and reflected light Lref when a failure occurs in the transmission path 81 of the standby system. The signal light Ls output from the down side transmitter 12 of the work system passes through the transmission path 80, the multiplexer 41, and the transmission side transmission path 8 and is input to the apparatus A 9a (see the dashed line).

In addition, the test light Ltst output from the down side transmitter 12 of the work system passes through the transmission path 80 and the multiplexer 41, reaches the optical filter 5 disposed in the transmission side transmission path 8, and is reflected by the optical filter 5 (see the alternate long and short dashed line). The reflected light Lref passes through the transmission side transmission path 8, is input to the multiplexer 41, is branched at a branch point P1 in the multiplexer 41, and is input to the two transmission paths 80 and 81 (see the chain double-dashed line).

The reflected light Lref input to the transmission path 80 of the work system is detected by the reflected light detector 13 of the work system. At this time, the level of the reflected light Lref falls between the first threshold TH1 and the second threshold TH2.

On the other hand, the reflected light Lref input to the transmission path 81 of the standby system does not reach the reflected light detector 13 due to a failure occurrence point P3 in the transmission path 81 (that is, a disconnection of the optical fiber), so the reflected light Lref is not detected by the reflected light detector 13 of the standby system. Accordingly, if the level of the reflected light Lref detected by the reflected light detector 13 of the standby system is 0 or less than the first threshold TH1, it is decided that a failure has occurred in the transmission path 81 of the standby system.

Figure 13:
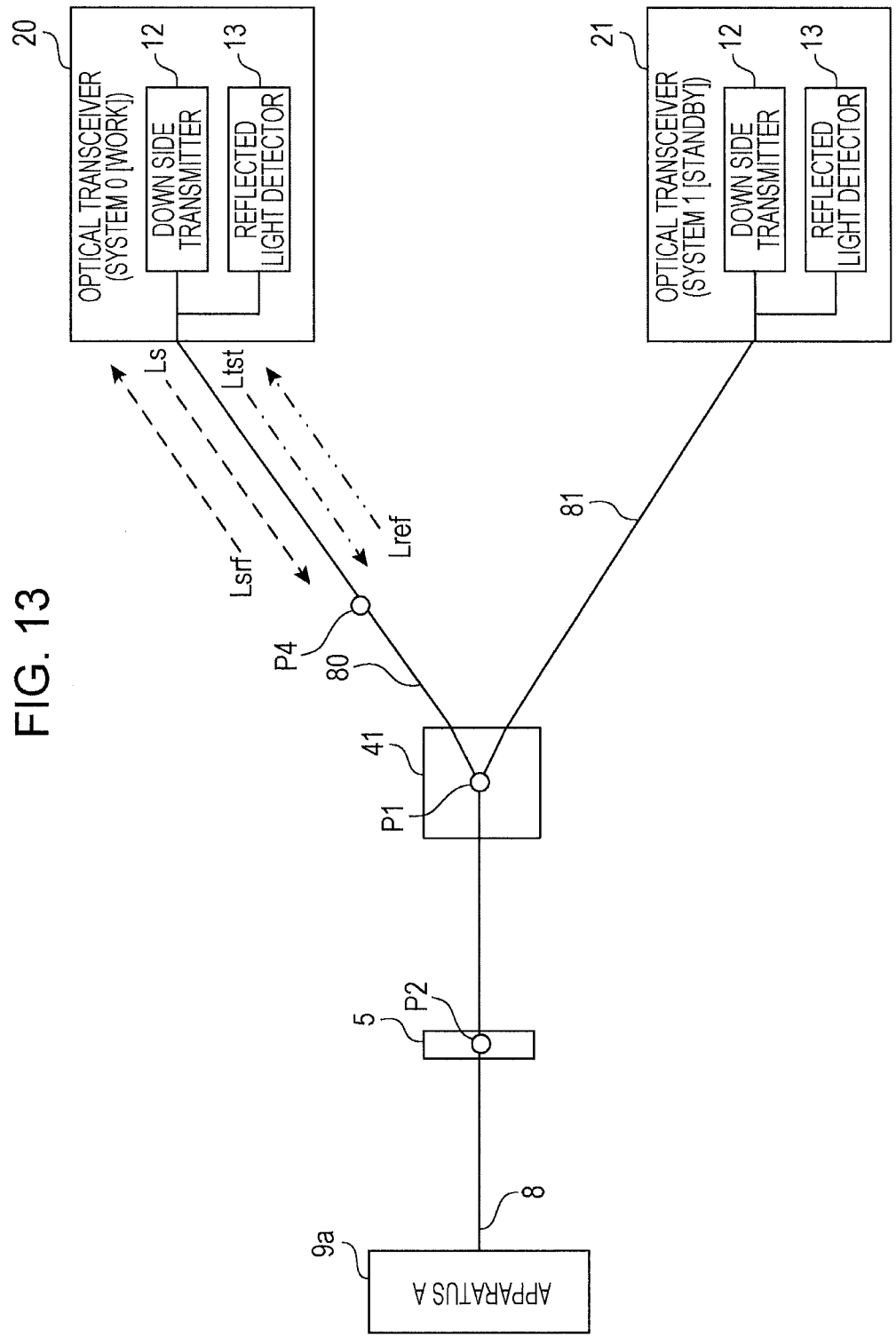
FIG. 13 depicts the paths of signal light, test light, and reflected light when a failure occurs in the transmission path of the work system.

FIG. 13 depicts the paths of signal light Ls, test light Ltst, and reflected light Lref when a failure occurs in the transmission path 80 of the work system. The signal light Ls output from the down side transmitter 12 is reflected at the failure occurrence point P4 (that is, at a cross section of the optical fiber) in the transmission path 80 and the reflected light Lsrf is input to the reflected light detector 13 of the work system. On the other hand, the test light Ltst output from the down side transmitter 12 of the work system is also reflected similarly at the failure occurrence point P4 and the reflected light Lref is input to the reflected light detector 13 of the work system.

At this time, the level of the reflected light Lref, which is larger than level PWL in FIG. 5, is approximately level PWR, for example. Accordingly, when the level of the reflected light Lref detected by the reflected light detector 13 of the work system larger than the second threshold TH2, it is decided that a failure has occurred in the transmission path 80 of the work system. A failure in the transmission path 80 of the work system is also detected by detecting the reflected light Lsrf of the signal light Ls instead of the reflected light Lref of the test light Ltst in the reflected light detector 13 of the work system. In this case, when the reflected light Lsrf is larger than a predetermined threshold, it is decided that a failure has occurred in the transmission path 80 of the work system.

If a failure occurs in the down side transmitter 12 of the standby system, the test light Ltst is not output. Accordingly, in this case, the reflected light Lref is not detected by the reflected light detectors 13 of the work system and the standby system.

FIG. 14 depicts conditions for determining a failure in the present embodiment. The conditions for determining a failure in the standby system are as described above. If only power P of the reflected light Lref of the standby system is used for determination of a failure in the standby system, when P<TH1 (P=0), it is impossible to determine whether the failure position is the transmission path 81 of the standby system, the down side transmitter 12 of the standby system (for example, light source), or the transmission path 80 of the work system. However, if the reflected light Lref of the work system is also used for determination, when P<TH1 (P=0) holds for power P, the failure position is determined to be the down side transmitter 12 (for example, light source) of the standby system. A failure in the work system is identified by power P of the reflected light Lref of the work system.

In the present embodiment, since the test light Ltst is output to the transmission path 80 of the work system to which the signal light Ls was output, the reflected light Lref is detected by the reflected light detector 13 of the standby system. In this case, since a failure is determined based on whether the reflected light Lref is present or absent, failure detection is easy. The signal light Ls is not input in the present embodiment. The test light Ltst is also input to the transmission path 81 of the standby system and, in this case, failure detection is enabled as well.

As described above, the failure detector 30 detects a failure based on the result of detection of the reflected light Lref in at least one of the work system and the standby system. Then, the switching unit 31 switches the work system based on the result of detection of a failure.

Figure 15:
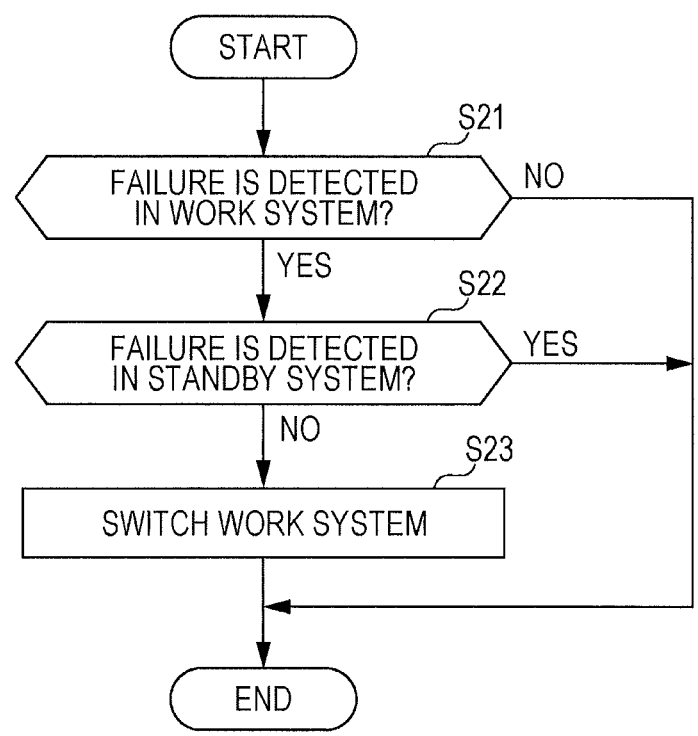
FIG. 15 is a flowchart depicting switching by a switching unit.

FIG. 15 is a flowchart depicting switching by the switching unit 31. First, the switching unit 31 determines whether a failure is detected in the work system based on the result of detection of a failure (operation S21). If no failure is detected in the work system (NO in operation S21), the switching unit 31 ends processing.

On the other hand, if a failure is detected in the work system (YES in operation S21), the switching unit 31 determines whether a failure was detected in the standby system based on the result of detection of a failure (operation S22). If no failure is detected in the standby system (NO in operation S22), the controller 3 switches the work system from system 0 to system 1 (operation S23). The switching is controlled by the switching signal output from the switching unit 31 to the optical transceivers (system 0) 20 and the optical transceivers (system 1) 21 of the work system and the standby system, as described above. At this time, in the above embodiment, a wavelength selection signal is output to the transmitters 12 of the work system and the standby system and the transmitter 12 of the standby system outputs the signal light Ls instead of the test light Ltst.

Upon completion of the switching, outputting of the signal light Ls to the transmission path 80 of the work system (system 0) is stopped and outputting of the signal light Ls to the transmission path 81 of the work system (system 1) is started. This switches the work system to system 1 from system 0.

On the other hand, if a failure is detected in the standby system (YES in operation S22), the switching unit 31 ends processing without switching the work system. Switching is performed in this way.

As described above, the controller 3 does not switch the work system if a failure is detected in the standby system. In other words, if the failure detector 30 detects a failure in a transmission path 81 of the plurality of transmission paths 80 and 81 to which the signal light Ls was not input, the switching unit 31 does not perform switching to the down side transmitter 12 connected to the transmission path 81. Since switching to the failed standby system is not performed, degradation or interruption of communication services does not occur.

One standby system is present in the above embodiments, but two or more standby systems may be present. In this case, a failure is detected for each of the standby systems by using a similar method.

As described above, the transmitters 12 (signal output units 121) of the work system and the standby system are connected to the two transmission paths 80 and 81 branched from the transmission side transmission path 8, respectively, and output the signal light Ls selectively to the two transmission paths 80 and 81. In addition, the transmitters 12 (test light output units 122) of the work system and the standby system outputs the test light Ltst with a wavelength $\lambda 1$ different than in the signal light Ls to one of the two transmission paths 80 and 81. In addition, the failure detector 30 detects a failure in the transmission paths 80 and 81 based on the result of detection of the reflected light Lref of the test light Ltst input from at least one of the two transmission paths 80 and 81.

Since the reflected light Lref input from the two transmission paths 80 and 81 are detected by outputting the test light Ltst to one of the two transmission paths 80 and 81 in the transmission apparatuses 1a and 1b according to the embodiment, the state of the transmission path 81 of the standby system to which the signal light Ls is not input is monitored. The wavelength $\lambda 1$ of the test light Ltst is different from the wavelength $\lambda 0$ of the signal light Ls, so the signal light Ls is not affected. Accordingly, a failure in the transmission path 81 of the standby system is effectively detected before switching the work system.

In the failure detection method according to the embodiment, the signal light Ls is output selectively to the transmission paths 80 and 81 branched from the transmission side transmission path 8 and the test light Ltst with the wavelength $\lambda 1$ different than in the signal light Ls is selectively output to the two transmission paths 80 and 81. A failure in the two transmission paths 80 and 81 is detected based on the result of detection of the reflected light Lref of the test light input from at least one of the two transmission paths 80 and 81. Accordingly, the failure detection method according to the embodiment can obtain the same effects as in the transmission apparatuses 1a and 1b according to the embodiment.

The present disclosure is specifically described above with reference to preferred embodiments, but it is clear that those skilled in the art can achieve various modifications based on the basic technical concept and instruction of the present disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus comprising:
a first transceiver configured to couple to at least one of a plurality of transmission paths;
a second transceiver configured to couple to another one of the plurality of transmission paths;
the first transceiver being configured as a work system to transmit signal light selectively to the at least one of the plurality of transmission paths, and the second transceiver being configured as a standby system to transmit test light with a wavelength different from a wavelength of the signal light to the another one of the plurality of transmission paths; and
a detector configured to detect a failure in the first transceiver while detecting a failure in the second transceiver based on a result of detection of a reflected light of the test light received through the at least one of the plurality of transmission paths and the another one of the plurality of transmission paths, such that if a failure is detected in the first transceiver while no failure is detected in the second transceiver, the second transceiver becomes the work system to transmit the signal light.

2. The transmission apparatus according to claim 1, wherein each of the first and second transceivers has an optical tunable oscillator to generate the signal light or the test light by selecting a wavelength.

3. The transmission apparatus according to claim 1, wherein the detector detects a failure in cases where there is no reflected light detected in the at least one of the transmission paths.

4. The transmission apparatus according to claim 1, wherein the detector detects a failure in cases where a level of the reflected light received through the transmission path to which the test light was transmitted, is larger than a predetermined value.

5. The transmission apparatus according to claim 3, wherein the second transceiver transmits the test light to one of the transmission paths to which the signal light was not transmitted.

6. The transmission apparatus according to claim 3, wherein the second transceiver transmits the test light to one of the branched transmission paths to which the signal light was transmitted.

7. The transmission apparatus according to claim 1, further comprising:
- a plurality of first transceivers;
- a switching unit configured to switch between the plurality of first transceivers that transmit the signal light,
- wherein the switching unit does not switch between the plurality of the first transceivers in cases where the detector detects a failure.

8. A transmission system comprising:
- a plurality of transmission paths branched from one transmission path;
- a transmission apparatus configured to include:
  - a first transceiver configured to couple to at least one of the plurality of transmission paths;
  - a second transceiver configured to couple to another one of the plurality of transmission paths;
  - the first transceiver configured to transmit signal light selectively to the at least one of the plurality of transmission paths, and the second transceiver configured as a standby system to transmit test light with a wavelength different from a wavelength of the signal light to the another one of the plurality of transmission paths; and
  - a detector configured to detect a failure in the first transceiver while detecting a failure in the second transceiver based on a result of detection of a reflected light of the test light received through the at least one of the plurality of transmission paths, such that if a failure is detected in the first transceiver while no failure is detected in the second transceiver, the second transceiver becomes the work system to transmit the signal light;
- a coupler configured to couple optical signals transmitted through the transmission paths to an optical signal to be transmitted through the one transmission path, and to split an optical signal transmitted through the one transmission path to optical signals to be transmitted through the optical paths; and
- an optical filter arranged configured to pass the signal light and reflect the test light.

9. A failure detection method comprising:
- transmitting signal light selectively to one of a plurality of transmission paths via a first transceiver;
- transmitting test light with a wavelength different from a wavelength of the signal light to another of the transmission paths via a second transceiver; and
- detecting a failure in the first transceiver while detecting a failure in the second transceiver, based on a result of detection of reflected light of the test light received through at least one of the transmission paths;
- causing the signal light to be transmitted via the second transceiver if a failure is detected in the first transceiver while no failure is detected in the second transceiver.

10. The failure detection method according to claim 9, wherein the signal light and the test light are generated selectively by an optical tunable oscillator by selecting a wavelength.

11. The failure detection method according to claim 9, wherein a failure is detected in case where there is no reflected light detected in at least one of the transmission paths.

12. The failure detection method according to claim 9, wherein a failure is detected in cases where a level of the reflected light received through the transmission path to which the test light was transmitted, is larger than a predetermined value.

13. The failure detection method according to claim 11, wherein the test light is transmitted to one of the transmission paths to which the signal light was not transmitted.

14. The failure detection method according to claim 11, wherein the test light is transmitted to one of the transmission paths to which the signal light was transmitted.

15. The failure detection method according to claim 9, wherein the reflected light of the test light is generated by a wavelength filter arranged on the one transmission path, that passes the signal light and reflects the test light.

16. The transmission apparatus according to claim 1,
- wherein the first transceiver, as the work system, transmits signal light selectively to the at least one of the plurality of transmission paths through a first waveguide unit,
- wherein the second transceiver, as the standby system, transmits test light with a wavelength different from a wavelength of the signal light to the another one of the plurality of transmission paths through a second waveguide unit, and
- wherein the first waveguide unit and the second waveguide unit guide the reflected light to the detector so as to provide the result of detection of the reflected light.

* * * * *